(12) United States Patent
Kitano et al.

(10) Patent No.: US 7,615,286 B2
(45) Date of Patent: Nov. 10, 2009

(54) FIXING MEMBER, MANUFACTURING METHOD THEREOF, AND FIXING APPARATUS AND ELECTROPHOTOGRAPHIC IMAGE FORMING APPARATUS USING THE SAME

(75) Inventors: Yuji Kitano, Tokyo (JP); Osamu Soutome, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 12/058,884

(22) Filed: Mar. 31, 2008

(65) Prior Publication Data

US 2008/0187852 A1 Aug. 7, 2008

Related U.S. Application Data

(63) Continuation of application No. PCT/JP2007/074178, filed on Dec. 10, 2007.

(30) Foreign Application Priority Data

| Dec. 22, 2006 | (JP) | ............................. 2006-346269 |
| Nov. 27, 2007 | (JP) | ............................. 2007-305998 |

(51) Int. Cl.
*G03G 15/20* (2006.01)
(52) U.S. Cl. ..................... 428/448; 399/320; 399/329; 399/333; 428/421; 428/422; 428/450; 492/56
(58) Field of Classification Search ................. 399/320, 399/329, 333; 428/421, 422, 448, 450; 492/56
See application file for complete search history.

(56) References Cited

U.S. PATENT DOCUMENTS 6,479,158 B1 11/2002 Kuntz et al. ................. 428/447

FOREIGN PATENT DOCUMENTS

| JP | 6-95545 | 4/1994 |
| JP | 10-293492 | 11/1998 |
| JP | 2006-133304 | 5/2006 |

OTHER PUBLICATIONS

International Preliminary Report on Patentability (with English Translation), dated Jul. 10, 2009, issued by the International Bureau, in International Application No. PCT/JP2007/074178.

*Primary Examiner*—D. S Nakarani
(74) *Attorney, Agent, or Firm*—Fitzpatrick, Cella, Harper & Scinto (57) ABSTRACT

An object of the present invention is to provide a fixing member which includes a surface layer including fluorine rubber having an ether bond and a polysiloxane having a polyether structure, and which has excellent adhesion between the surface layer and a substrate. A fixing member is provided including a substrate, an adhesion layer and a surface layer disposed in contact with the adhesion layer, wherein the surface layer includes fluorine rubber having an ether bond and a polysiloxane having a polyether structure, and wherein the adhesion layer contains a polyorganosiloxane resin and an existence ratio of carbon combining with oxygen to silicon combining with oxygen in the adhesion layer is 1.0 or more and 20.0 or less.

8 Claims, 4 Drawing Sheets

FIXING MEMBER, MANUFACTURING METHOD THEREOF, AND FIXING APPARATUS AND ELECTROPHOTOGRAPHIC IMAGE FORMING APPARATUS USING THE SAME

This application is a continuation of International Application No. PCT/JP2007/074178, filed Dec. 10, 2007, which claims the benefit of Japanese Patent Application No. 2006-346269, filed Dec. 22, 2006, and Japanese Patent Application No. 2007-305998, filed Nov. 27, 2007.

BACKGROUND OF THE INVENTION

1. Field of the Invention

The present invention relates to a fixing member and a manufacturing method thereof. The present invention particularly relates to a fixing member used for thermal fixing of a toner in an electrophotographic image forming apparatus such as photocopying machines and printers, and a method for manufacturing the fixing member. Further, the present invention relates to a fixing apparatus and an electrophotographic image forming apparatus using the fixing member.

2. Description of the Related Art

A fixing member generally includes a surface layer excellent in toner releasing property. As such a surface layer, a surface layer including a fluororesin or fluorine rubber has been proposed. Despite the fact that such a surface layer is excellent in toner releasing property, there has been a room for improvement in adhesion to a substrate. Therefore, as a method for improving adhesion to a substrate of a surface layer containing fluorine rubber, Japanese Patent Application Laid-Open No. H10-293492 discloses a method for interposing an aminosilane adhesive coating containing an aminosilane composition and an organic phosphonium catalyst between a supporting member and a surface layer containing fluorine rubber.

SUMMARY OF THE INVENTION

The present inventors have investigated conventional fixing members, and consequently succeeded in development of a surface layer material excellent in toner releasing property and capable of providing a high quality electrophotographic image.

The surface layer material includes a coating material including a fluorine atom-containing polymer having an ether bond in a molecule and a polysiloxane having a polyether structure. Further, a surface layer obtained by crosslinking a coating film of the coating material has a structure in which a polysiloxane having a polyether structure is uniformly dispersed in a fine island form in a matrix of fluorine rubber having an ether bond. A fixing member including such a surface layer has an extremely high releasing property of a toner, particularly a toner containing wax. In addition, since the surface layer is flexible, an unfixed toner is not excessively pressed during fixation and thus an extremely high quality electrophotographic image can be formed.

However, in application of such a surface layer to a fixing member, there arises a problem that adhesion to a substrate must be further improved. The above-mentioned adhesive proposed in Japanese Patent Application Laid-Open No. H10-293492 does not necessarily have sufficient adhesion to a substrate of the surface layer.

Accordingly, the present inventors have led to recognize that it is necessary to find a new construction capable of further improving the above-mentioned adhesion to a substrate of a surface layer in order to provide a fixing member capable of retaining excellent toner releasing property for a long period of time.

Therefore, the present invention has an object to provide a fixing member excellent in adhesion to a substrate of a surface layer including fluorine rubber having an ether bond and a polysiloxane having a polyether structure.

The present invention has another object to provide a method for manufacturing such a fixing member.

Further, the present invention has another object to provide a fixing apparatus and an electrophotographic image forming apparatus capable of stably providing a high quality electrophotographic image for a long period of time.

According to the present invention, there is provided a fixing member including a substrate, an adhesion layer and a surface layer disposed in contact with the adhesion layer, wherein the surface layer includes fluorine rubber having an ether bond and a polysiloxane having a polyether structure, and wherein the adhesion layer contains a polyorganosiloxane resin and an existence ratio of carbon combining with oxygen to silicon combining with oxygen in the adhesion layer is 1.0 or more and 20.0 or less.

According to the present invention, there is provided a method for manufacturing a fixing member according to the present invention is characterized by including the steps of: (1) forming an adhesion layer containing a polyorganosiloxane resin on a substrate; and (2) forming a coating film of a coating material including a fluorine atom-containing polymer having an ether group in a molecule and a polysiloxane having a polyether structure on a surface of the adhesion layer, and crosslinking the coating film to form a surface layer including fluorine rubber having an ether bond and a polysiloxane having a polyether structure.

Further, according to the present invention, there is provided a fixing apparatus comprising the above-mentioned fixing member.

Further, according to the present invention, there is provided an electrophotographic image forming apparatus comprising the above-mentioned fixing apparatus.

According to the present invention, a fixing member excellent in durability for maintaining excellent toner releasing property for a long period of time can be obtained.

According to the present invention, a fixing apparatus and an electrophotographic image forming apparatus capable of stably providing a high quality electrophotographic image for a long period of time can also be obtained.

Further features of the present invention will become apparent from the following description of exemplary embodiments with reference to the attached drawings.

DESCRIPTION OF THE EMBODIMENTS

(1) Basic Construction

Figure 1:
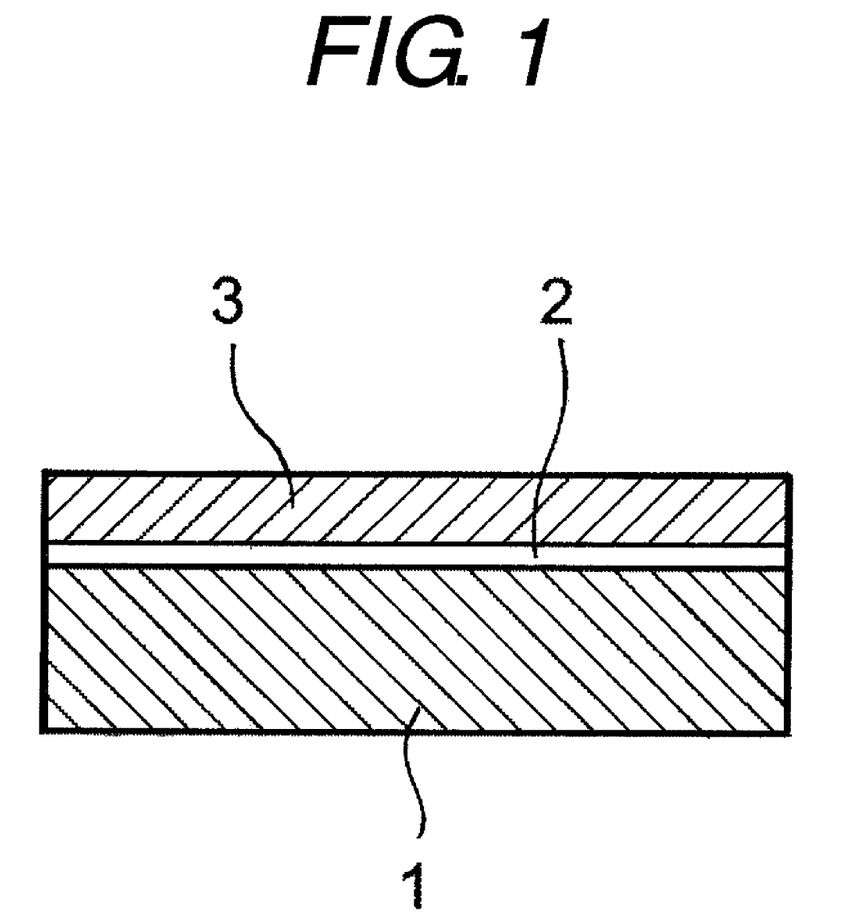
FIG. 1 is a constitutional view of a cross-sectional layer of a fixing member according to the present invention.

FIG. 1 illustrates a schematic cross-sectional view of a fixing member according to the present invention. In FIG. 1, a substrate 3, an adhesion layer 2 and a surface layer 1 are illustrated.

(2) Surface Layer 1

A surface layer 1 includes fluorine rubber having an ether bond and a polysiloxane having a polyether structure.

A surface layer including fluorine rubber generally has a low affinity to wax contained in a toner. As a method for improving affinity to wax in such a surface layer, a method for dispersing a polysiloxane having a relatively high affinity to wax (dimethyl polysiloxane etc.) in fluorine rubber is considered.

However, since affinity between fluorine rubber and a polysiloxane is low, these dispersed states tend to be nonuniform. In this case, adherence of wax in a toner to a surface layer of a fixing member also tends to be nonuniform.

On the other hand, a surface layer having a construction in which a polysiloxane is finely dispersed in a matrix of fluorine rubber by crosslinking a coating film of a coating material including a fluorine atom-containing polymer having an ether bond in a molecule and a polysiloxane having a polyether bond can be obtained. That is, a crosslinkable fluorine atom-containing polymer having an ether bond in a molecule is used as a raw material of fluorine rubber, and simultaneously, a polysiloxane having a polyether structure is used as a polysiloxane. When the fluorine atom-containing polymer and the polysiloxane are coexisted in a coating material, affinity between the fluorine atom-containing polymer and the polysiloxane is excellent and thus the polysiloxane can be finely dispersed in the fluorine atom-containing polymer. When crosslinking a coating film of such a coating material, a surface layer having a structure which contains fluorine rubber having an ether bond as a matrix and in which a polysiloxane having an ether structure is uniformly and finely dispersed in an island form in the matrix can be obtained. Such a surface layer has uniform adherence to wax in a toner and exhibits good toner releasing property. Herein, an average particle diameter based on a number of an island portion including a polysiloxane in a surface layer is preferably 0.1 μm or larger and 2.0 μm or smaller. This is because a wax component in a toner can be retained uniformly and securely on a surface of a surface layer. In the present invention, measurement of the average particle diameter of an island portion is performed by an electron microscope. Twenty island portions are randomly selected and a major axis of each of the island portions is measured. Among the measured values, an average value of 14 measured values except for 3 measured values each from the largest value side and the smallest value side is defined as an average particle diameter of the island portion.

(2-1) Fluorine Rubber

Examples of a raw material of fluorine rubber constituting the above-mentioned surface layer include a crosslinkable fluorine atom-containing polymer having an ether bond in a molecule. Specific examples of the fluorine atom-containing polymer include a terpolymer of vinylidene fluoride, tetrafluoroethylene and perfluoro alkyl vinyl ether having an ether group.

Such a terpolymer can be synthesized, for example, using vinylidene fluoride, tetrafluoroethylene and perfluoro methyl vinyl ether each containing iodine or fluorine in a molecule by a known method. Examples of the known method include a method for polymerizing vinylidene fluoride, tetrafluoroethylene and perfluoro methyl vinyl ether of copolymer components with a monomer containing iodine or fluorine of a crosslinking site by a known method such as bulk polymerization, solution polymerization, suspension polymerization or emulsion polymerization.

Further, such a terpolymer is commercially available.

A terpolymer is commercially available, for example, as a trade name "Daiel LT-302" from Daikin Industries, Ltd. A terpolymer is also commercially available under the following trade names from DuPont Performance Elastomers K. K. "Viton GLT", "Viton GLT-305", "Viton GLT-505", "Viton GFLT", "Viton GFLT-300", "Viton GFLT-301", "Viton GFLT-501" and "Viton GFLT-600"

(2-2) Polysiloxane

A polysiloxane has preferably a dialkylpolysiloxane structure, and more preferably dimethylpolysiloxane structure as a hydrophobic group. Further, a polysiloxane is a nonionic surfactant having preferably a polyether structure, and more preferably a polyoxyalkylene structure as a hydrophilic group.

Since a dialkylpolysiloxane-based surfactant has a siloxane skeleton, it has a low volatility and excellent thermal stability and is thus suitable for use of a fixing member used at high temperatures.

Taking dimethylpolysiloxane as an example, a polysiloxane surfactant can be mainly classified into three kinds of structures.

The structures are, that is, a side chain modified type including a structure in which a polyoxyalkylene combines with a side chain of a dimethylpolysiloxane skeleton represented by the following formula (1); an end modified type including a structure in which a polyoxyalkylene combines with an end of a dimethylpolysiloxane skeleton represented by the following formula (2); and a copolymerization type including a structure in which dimethylpolysiloxane represented by the following formula (3) and a polyoxyalkylene are alternately and repeatedly combined with each other. The copolymerization type represented by the following formula (3) is particularly preferable from the viewpoint of having the most excellent dispersibility in fluorine rubber.

In the above-mentioned formulas (1) to (3), a and b are 0 or an integer; n and m are an integer; R and R' are a saturated hydrocarbon chain or an unsaturated hydrocarbon chain.

An amount of a polysiloxane added is preferably 20 parts by mass or more and 60 parts by mass or less, particularly preferably 40 parts by mass and 60 parts by mass or less based on 100 parts by mass of fluorine rubber. When a polysiloxane is used in the range, an effect for improving toner releasing property can be sufficiently obtained and mechanical strength of fluorine rubber can be maintained in a suitable range.

Further, a polysiloxane having a polyether structure is not particularly limited, but a copolymerization type of dimethylpolysiloxane and a polyalkyleneoxide is preferable. Furthermore, a polysiloxane having a functional group capable of reacting with an adhesion layer, for example, a vinyl group or an allyl group is more preferable.

(2-3) Crosslinking Agent

The above-mentioned fluorine atom-containing polymer and the above-mentioned polysiloxane form a structure in which a polysiloxane having a polyether structure is finely dispersed in a matrix of fluorine rubber by crosslinking reaction of the fluorine atom-containing polymer.

Herein, a crosslinking agent used for crosslinking is preferably an organic peroxide. This is because an organic peroxide can better crosslink a mixture of the above-mentioned fluorine rubber and the above-mentioned polysiloxane surfactant having a polyether structure.

That is, a large portion of a silicone-based surfactant added can be reacted with fluorine rubber and fixed in a matrix of fluorine rubber. Therefore, durability of toner releasing property of a surface layer can be made more excellent.

Examples of such a crosslinking agent include the following:
benzoyl peroxide;
bis(2,4-dichlorobenzoyl)peroxide;
dicumyl peroxide; and
2,5-dimethyl-2,5-di(t-butyl peroxy)hexane.

Benzoyl peroxide having a low evaporation loss at room temperature and a low decomposition temperature is particularly preferable.

Further, use of crosslinking agents other than the above-mentioned crosslinking agents should not be excluded.

When a fluorine atom-containing polymer has iodine or fluorine at a molecular chain end or a side chain, crosslinking by an organic peroxide is efficiently performed by reaction for removing an iodine atom or a fluorine atom, radical reaction of an auxiliary crosslinking agent to an allyl group, or the like.

Accordingly, when the organic peroxide is used as a crosslinking agent, it is preferably used in combination with triallyl cyanurate, triallyl isocyanulate or the like as an auxiliary crosslinking agent. Triallyl isocyanulate is particularly preferable from the viewpoint of crosslinking efficiency.

Further, when a polysiloxane having a polyether structure has a vinyl group or an allyl group as a reactive group, crosslinking by an organic peroxide is performed, for example, by radical reaction to a vinyl group or an allyl group.

The surface layer 1 can be formed by forming a coating film of a coating material including the above-mentioned fluorine atom-containing polymer, the above-mentioned polysiloxane and the above-mentioned crosslinking agent as essential constituents on the adhesion layer 2 formed on the substrate 3, and crosslinking the fluorine atom-containing polymer in the coating film.

Further, since a wax component in a toner is uniformly adhered to the surface layer, good toner releasing property is exhibited. In addition, flexibility of fluorine rubber relaxes toner pressing during fixation, and can thus contribute to form a high quality electrophotographic image.

(3) Adhesion Layer 2

However, when the surface layer is formed on a conventional crosslinkable adhesive as described in Japanese Patent Application Laid-Open No. H10-293492, adhesion strength to a substrate is not sufficient. The reason is considered that adhesion between the above-mentioned polysiloxane having a polyether structure in a coating material for a surface layer and the crosslinkable adhesive is weak.

On the contrary, the above-mentioned coating material for forming a surface layer is applied on an adhesion layer that is described later, and a fluorine atom-containing polymer in the coating material is crosslinked to form a surface layer, and thereby the surface layer can be firmly adhered to a substrate.

An adhesion layer exhibiting such a significant effect will be described below in detail.

(3-1) Numerical Range of C—O/Si—O

An adhesion layer contains a polyorganosiloxane resin. A polyorganosiloxane resin has excellent affinity to fluorine rubber and thus is important for maintaining adhesion to a substrate of a fluorine rubber-containing layer. In addition, the adhesion layer includes a carbon-oxygen bond and the adhesion layer has an existence ratio of carbon combining with oxygen to silicon combining with oxygen (hereinafter, abbreviated as "C—O/Si—O") of 1.0 or more and 20.0 or less, particularly 3.0 or more and 10.0 or less.

(3-2) Technical Significance of (C—O/Si—O)

C—O/Si—O of an adhesion layer is regarded as a measure of affinity between an adhesion layer and a surface layer. It is considered that as a ratio of C—O/Si—O is larger, affinity of the adhesion layer 2 to the surface layer 1 is higher.

That is, it is considered that when an adhesion layer has a carbon-oxygen bond, it has higher affinity to a polysiloxane having a polyether structure in a coating material for forming a surface layer, and thus adhesion between the adhesion layer and rubber in a surface layer is improved.

In the present invention, however, carbon forming a double bond with oxygen (C=O) and carbon combining with not only oxygen but also nitrogen (N—C—O) are not included in carbon combining with oxygen.

(3-3) Calculation Method of (C—O/Si—O)

In the present invention, an existence ratio C—O/Si—O of carbon combining with oxygen to silicon combining with oxygen in an adhesion layer is determined by ESCA (Electron Spectroscopy for Chemical Analysis) analysis.

Firstly, an adhesion layer is analyzed, elements are assigned from the obtained wide scan spectrum and an existing concentration of each of atoms (atomic %) existing in the adhesion layer is determined from a relative peak intensity ratio of each of the elements. Next, peak separation is performed from a narrow scan spectrum of each of the elements to determine a chemical bond state of each of the elements and a ratio thereof.

Ratios of C—O and Si—O can be calculated from an existing concentration of each of carbon, silicon and nitrogen, an existing ratio of either C—O or C—N of carbon, an existing ratio of Si—O of silicon, an existing ratio of N—C of nitrogen that are obtained from these results to determine C—O/Si—O.

This ratio of C—O/Si—O can be determined by ESCA analysis after forming an adhesion layer on a substrate.

Herein, it is considered that a value determined by analyzing a surface of an adhesion layer 2 after forming the adhesion layer on a substrate is basically equal to a value determined by analyzing an inner portion of an adhesion layer after forming a surface layer on the adhesion layer.

(3-4) Raw Material for Forming Adhesion Layer 2

The above-mentioned adhesion layer can be formed as follows.

The following (a1) to (a3), or (a1) to (a4) are dissolved in an alcohol-based solvent.

(a1) Silane coupling agent having an amino group (a2) Silane coupling agent having a vinyl group (a3) Desired amount of polyalkylene glycol (a4) Known catalyst for a silane coupling agent After this solution is sprayed on a substrate of a roller or a belt, or this solution is applied by dipping or the like, the obtained substrate is left standing at room temperature for 30 minutes, and then subjected to heat treatment.

As conditions of heat treatment, for example, temperature is 100° C. or higher and 200° C. or lower, and treatment time is from 1 minute to 60 minutes.

An adhesion layer having at least a carbon-oxygen bond and C—O/Si—O in a range of 1.0 or more and 20.0 or less can be formed as described above.

Further, a value of C—O/Si—O in an adhesion layer can be adjusted by adjusting ratios of the above-mentioned (a1), (a2) and (a3). C—O/Si—O in an adhesion layer can be relatively decreased by particularly reducing a molar ratio of (a3).

Specifically, when a molar ratio of aminosilane as (a1), vinylsilane as (a2) and polyethylene glycol as (a3) is adjusted to 1:1:1, C—O/Si—O in an adhesion layer can be adjusted to 6.6. Further, C—O/Si—O in an adhesion layer can be adjusted to 3.0 by changing the molar ratio to 1:1:0.45. Furthermore, C—O/Si—O in an adhesion layer can be adjusted to 1.8 by changing the molar ratio to 1:1:0.25.

(3-5) Method for Forming Adhesion Layer 2

A method for forming an adhesion layer according to the present invention will be specifically described.

For example, a mixed solution of a silane coupling agent and a polyalkylene glycol is applied on a substrate, dried and then subjected to heat treatment. In doing so, not only the silane coupling agent is fixed as a polyorganosiloxane on the substrate, but also an adhesion layer including a polyorganosiloxane having a carbon-oxygen bond derived from the polyalkylene glycol can be formed.

The above-mentioned coating material for forming a surface layer is applied on such an adhesion layer and a coating film of the coating material is crosslinked.

In doing so, excellent affinity between a carbon-oxygen bond and a polysiloxane in the adhesion layer becomes high in a process in which a fluorine atom-containing polymer in the coating film formed on the adhesion layer is converted to fluorine rubber by crosslinking reaction. As a result, it is considered to improve adhesion between the adhesion layer and rubber of a surface layer.

A method for forming a polyorganosiloxane adhesion layer having at least a carbon-oxygen bond is not limited to the above method. If a solution containing a silane coupling agent previously having a polyalkylene glycol group is applied and dried, an adhesion layer including a polyorganosiloxane having at least a carbon-oxygen bond can be formed. In addition, a reactive group of a portion having at least a carbon-oxygen bond is not limited to a hydroxyl group and may be any group as long as it can be reacted when a surface layer is crosslinked. Examples thereof include a vinyl group and an amino group.

(4) Application and Crosslinking Process of Coating Material for Forming Surface Layer on Adhesion Layer Next, the following (a) to (d) are dissolved in a ketone-based solvent and thoroughly stirred to prepare a coating material for forming a surface layer.

(a) Fluoropolymer containing iodine or fluorine in a molecule as a reactive group and having an ether group (b) Polysiloxane-based surfactant having a polyether structure (c) Triallyl isocyanulate as a crosslinking agent (d) Benzoyl peroxide that is an organic peroxide as a crosslinking agent The coating material is coated on a surface of an adhesion layer on a substrate that is previously prepared, and dried, and then subjected to primary crosslinking in an oven whose inside atmosphere has been replaced with nitrogen gas and then subjected to secondary crosslinking in a conventional heating oven, thereby forming a surface layer.

Examples of a coating method include, but are not particularly limited to, spray coating, slit coating, blade coating, roll coating, and dip coating. A thickness of a surface layer may be appropriately determined if necessary, but is generally preferably 10 μm or more for securing sufficient scratch resistance and abrasion resistance. In addition, the thickness is desirably 500 μm or less from the viewpoint of thermal conductivity to a surface.

(5) Substrate 3

As a substrate, a substrate made of metal (copper, aluminum, iron, nickel, SUS etc.) and rubber (silicone rubber etc.) can be used.

Shape of a substrate is not particularly limited. The shape can be made into a roller form or a belt form depending on configuration of a fixing member according to the present invention or an electrophotographic image forming apparatus adopting the fixing member.

(5-1) (Requirement of Adhesion Layer when Substrate Includes Silicone Rubber)

A substrate including silicone rubber can impart higher elasticity by a fixing member. A fixing member having high elasticity does not excessively press a developer when an unfixed developer is fixed on a transfer medium such as paper, and therefore it is advantageous for providing higher quality of an electrophotographic image.

When a substrate containing silicone rubber is used, it is more preferable that the adhesion layer 2 contains a polyorganosiloxane resin having a carbon-nitrogen bond in addition to a carbon-oxygen bond.

A polyorganosiloxane resin having a carbon-nitrogen bond is one derived from a silane coupling agent having an amino group.

When an adhesion layer including a polyorganosiloxane resin having at least a carbon-nitrogen bond is disposed on the substrate 3 including silicone rubber, it is considered that a crosslinking agent dissolved in a coating material for forming a surface layer can be prevented more efficiently from migrating into the substrate 3 during forming a surface layer.

When a crosslinking agent migrates into a substrate, an amount of the crosslinking agent in a coating film for forming a surface layer is decreased, and thus it is difficult for the coating film to crosslink in some cases. In a case of insufficient crosslinking, tackiness on the surface of a surface layer can be high. Tackiness is caused by tackiness of a surface and means tack strength exerted when a material is pressed on a surface and then peeled off from the surface. When a material having high tackiness is used as a fixing member, tack strength between the material and a paper sheet in contact with a surface or a toner becomes high, and thus a paper wrinkle may be generated during paper feeding. Such a phenomenon can be prevented by adopting the above-mentioned adhesion layer.

A polyorganosiloxane resin layer having a carbon-nitrogen bond in addition to a carbon-oxygen bond can be formed, for example, by applying a solution obtained by dissolving desired amounts of solutions of the following (a) to (b) in a high polar solvent on silicone rubber, drying the coated solution and subjecting it to heat treatment.

(a) Polyalkylene glycol (b) Silane coupling agent having an amino group

Herein, examples of the above-mentioned high polar solvent include alcohol, water and a mixed solvent of alcohol and water. Further, as a method for applying a solution on a silicone rubber layer, known methods such as a spray method and a dipping method may be used.

(5-1-1) UV Treatment when Substrate 3 Contains Silicone Rubber

As described above, when a substrate including silicone rubber is used, it is preferable that a surface of the substrate is previously irradiated with ultraviolet rays. The surface of the substrate is irradiated with ultraviolet rays, and thereby, a surface of silicone rubber is modified, alcohol, water or the like used when an adhesion layer is formed is easily wet-spread on the surface of silicone rubber, so that a more uniform adhesion layer can be formed.

Examples of silicone rubber capable of constituting a substrate include dimethyl silicone rubber and methyl phenyl silicone rubber.

(5-1-2) Method for Manufacturing Substrate Made of Silicone Rubber

A base layer including silicone rubber can be manufactured by a known method.

The base layer may be manufactured by, for example, a method in which a silicone rubber material is injected into a mold die, heated and cured, or a method in which a silicone polymer layer is formed by coating, and cured in a heating oven or the like.

A thickness of a base layer including silicone rubber is preferably 50 µm or more from the reason for securing following property for a recording material such as paper, and is preferably 5 mm or less from the viewpoint of thermal conductivity.

Examples of other manufacturing methods include a method for manufacturing a fixing member of the present invention by a method in which an uncrosslinked surface layer is then formed on an inner surface of a die by coating and an adhesion layer of the present invention is then formed on the inner surface.

(6) Configuration of Fixing Member

A fixing member according to the present invention may be any configuration of a fixing belt, a fixing roller, a pressure belt, a pressure roller or the like.

(7) Fixing Apparatus

Next, a fixing apparatus according to the present invention will be described.

The fixing apparatus of the present invention is a fixing apparatus used for an electrophotographic image forming apparatus. The fixing member according to the present invention is used for at least one of a pair of rollers or a pair of belts, each of which constitute a fixing apparatus and are disposed opposed to each other, or at least one of a roller and a belt which are disposed opposed to each other.

Examples of the electrophotographic image forming apparatus include an electrophotographic image forming apparatus including a photosensitive member, a latent image forming unit, a unit for developing the formed latent image with a toner, a unit for transferring the developed toner image to a recording material and a unit for fixing the toner image on the recording material.

Figure 2:
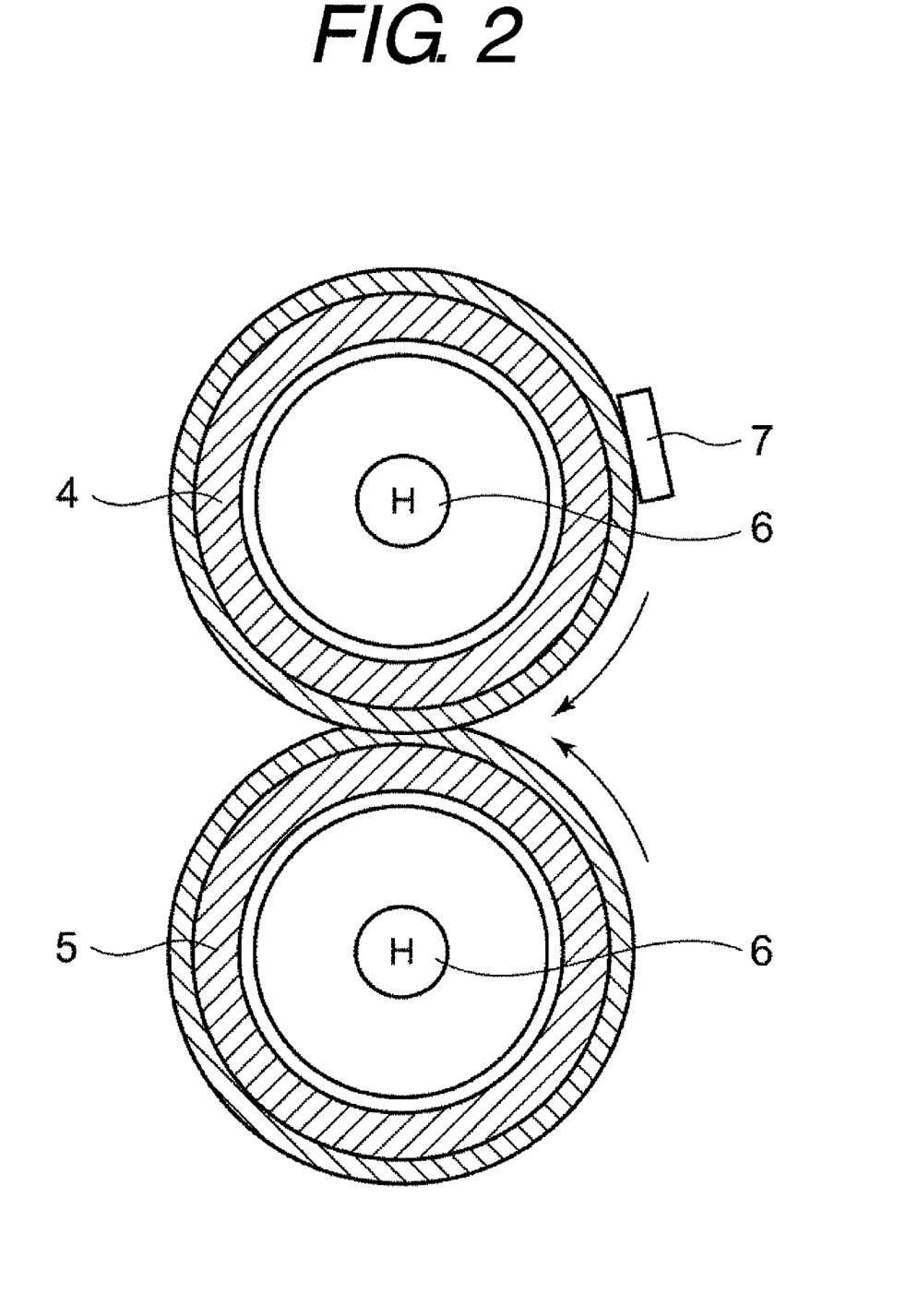
FIG. 2 is a schematic constitutional view of a configuration of a fixing apparatus in which a fixing roller according to the present invention is disposed.

FIG. 2 illustrates a schematic constitutional view of an example of a fixing apparatus according to the present invention.

A fixing roller 4 of an upper roller and a pressure roller 5 of a lower roller which is disposed opposed to the fixing roller 4 are disposed in the fixing apparatus. In this case, the fixing member according to the present invention is used for both the fixing roller 4 and the pressure roller 5.

Further, a heater 6 including a halogen lamp is incorporated at the center of each of the fixing roller 4 and the pressure roller 5.

The fixing roller 4 is rotated and driven in an arrow direction at a predetermined circumferential speed, accompanied by which the pressure roller is also rotated and driven in an arrow direction. Then, a toner image formed on a recording material such as paper is fixed with heat from the heater 6 and pressures caused by the fixing roller 4 and the pressure roller 5.

A fixing temperature is maintained at a set temperature by controlling an output of the heater 6 based on the surface temperature of the fixing roller 4 measured by a thermistor 7. A surface temperature of the fixing roller 4 (fixing temperature) is not particularly limited, but generally about 130° C. to 220° C.

Figure 3:
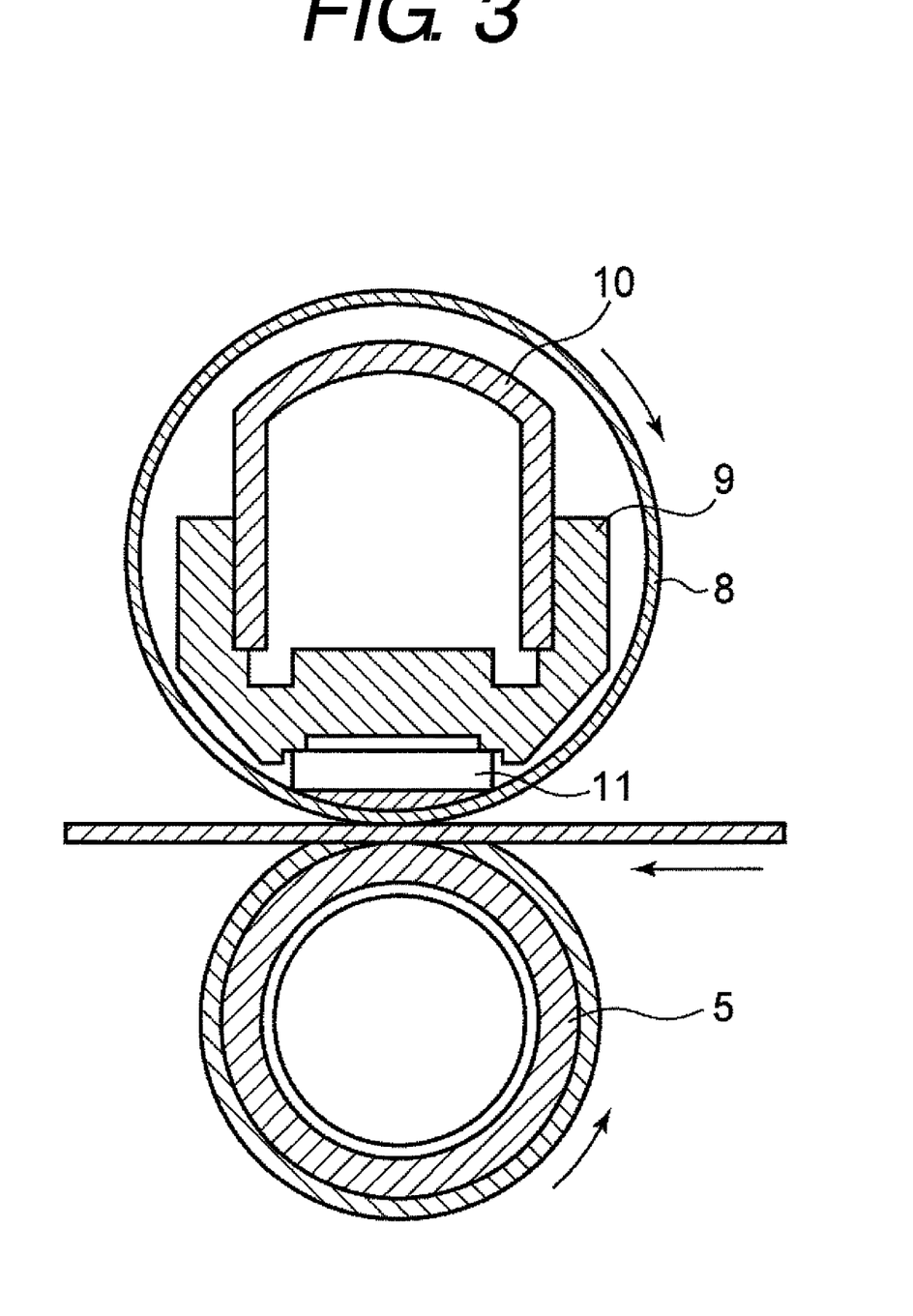
FIG. 3 is a schematic constitutional view of a configuration of a fixing apparatus in which a fixing belt according to the present invention is disposed.

Further, FIG. 3 illustrates a schematic constitutional view of an example of a fixing apparatus of another configuration in the present invention.

In FIG. 3, a fixing belt 8 in an endless belt form is inscribed at a circumferential length with a clearance relative to a belt guide member 9 and a stay 10.

A heating member 11 includes a layer in which an electric resistance material such as silver palladium (Ag/Pd) generating heat by applying power is coated in a linear form or a band form on a heating member substrate made of alumina or ceramic by screen printing or the like. Further, a glass coating layer having a thickness of about 10 µm is sequentially formed on this coated layer for securing protection and insulation property of the electric resistance material.

Further, a thermistor is in contact with a rear surface of the heating member substrate. Power control for an electric resistance material is performed depending on the detection temperature of this thermistor, and thereby a surface of the fixing belt can be maintained at a temperature capable of fixing a developer.

The pressure roller 5 is in contact with the heating member by pressure via the fixing belt 8, and rotated and driven by a pressure roller driving unit.

The pressure roller 5 is rotated and driven, followed by which the fixing belt 8 rotates. The fixing member of the present invention is used for the fixing belt 8 and the pressure roller 5.

A recording material such as paper having an unfixed image formed thereon is sandwiched and fed between the fixing belt 8 and the pressure roller 5, and thereby the unfixed image is heated and fixed on a recording material.

Therefore, an electrophotographic image forming apparatus including the above-mentioned fixing apparatus can stably provide a high quality electrophotographic image.

Figure 4:
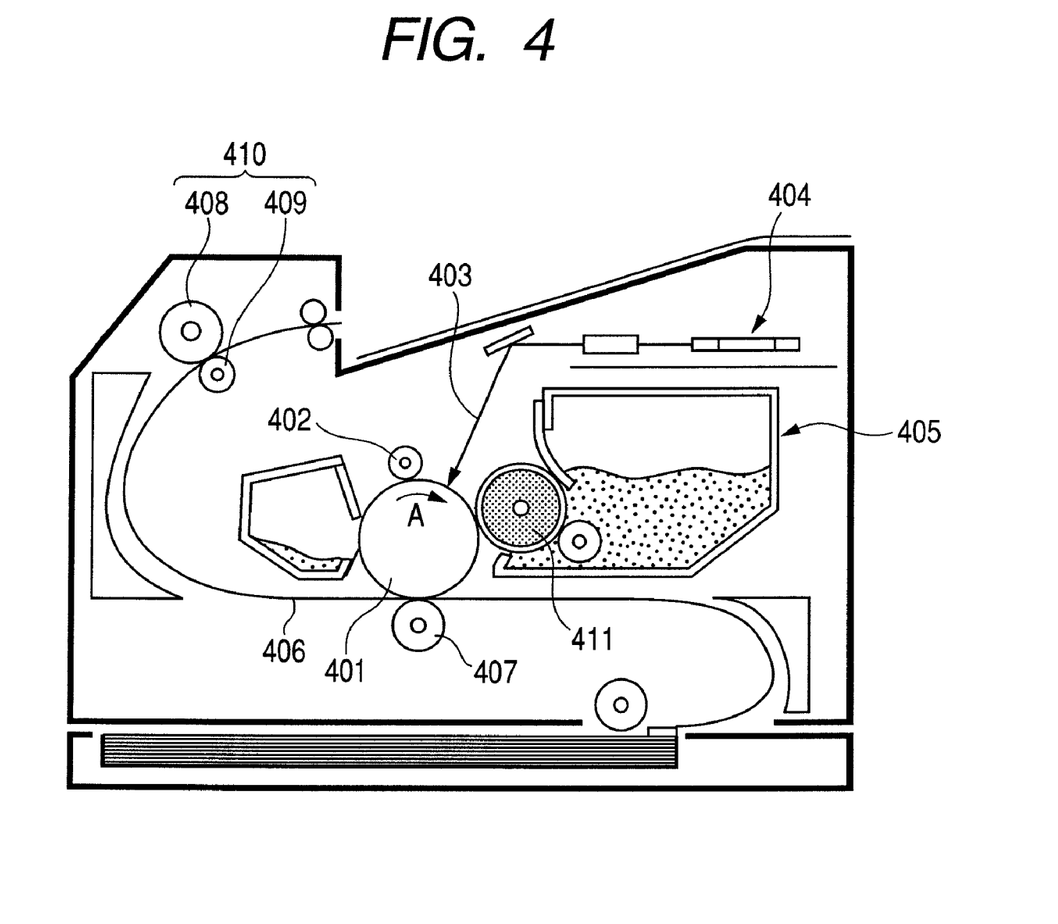
FIG. 4 is a schematic constitutional view of an electrophotographic image forming apparatus according to the present invention.

FIG. 4 is a schematic constitutional view showing an aspect of an electrophotographic image forming apparatus according to the present invention. The electrophotographic image forming apparatus illustrated in FIG. 4 includes the following members and apparatuses: a photosensitive drum 401; a charging roller 402 for charging the photosensitive drum 401; an exposure apparatus 404 for irradiating a modulated light 403 on a charged surface of the photosensitive drum 401; a developing apparatus 405 including a developing roller 411 for developing an electrostatic latent image formed on the photosensitive drum 401; a transfer roller 407 for transferring the toner image formed on the photosensitive drum 401 to a recording material 406 such as paper; and a fixing apparatus 410 including a fixing roller 408 for fixing the toner image transferred on the recording material 406 on a paper sheet and a pressure roller 409.

Further, a fixing apparatus according to the present invention illustrated in FIG. 2 or FIG. 3 is used as the fixing apparatus 410.

EMBODIMENTS

Hereinafter, the present invention will be described in detail by means of embodiments, however, it is not intended that the present invention be limited to these embodiments. Herein, an existence ratio C—O/Si—O of carbon combining with oxygen to silicon combining with oxygen in an adhesion layer was measured using an X-ray photoelectron spectrometer (trade name: Model 1600S manufactured by PHI) under the condition of X-ray source $MgK_\alpha$ (100 W). Firstly, elements are assigned from a wide scan spectrum and an existing concentration of each of elements (atomic %) existing in the adhesion layer was determined from a relative peak intensity ratio of each of the elements. For calculation of the existing concentration, a value obtained by converting a peak area of each of the elements into a relative peak intensity ratio using a relative sensitivity factor provided by PHI was used.

Next, peak separation of a C1s narrow scan spectrum was performed to determine an existing ratio of either C—O or C—N from a peak area ratio near 286 eV. Further, an existing ratio of N—C was determined from the peak area ratio by assuming that peak separation of an N1s narrow scan spectrum is performed and all peaks near 400 eV are amine-types (C—N—H).

Then, peak separation of a Si 2p narrow scan spectrum was performed to determine an existing ratio of Si—O near 102 to 103 eV from a peak area ratio, and C—O/Si—O was calculated from the following expressions:

A ratio of C—O={(an existing concentration of C)× (ratios of C—O and C—N)}−{(an existing concentration of N)×(a ratio of N—C)};

A ratio of Si—O=(an existing concentration of Si)×(a ratio of Si—O); and

C—O/Si—O=(a ratio of C—O)÷(a ratio of Si—O).

Further, initial evaluation and evaluation of adhesion durability were performed as follows.

[Initial Evaluation of Adhesion]

Adhesive strength between a surface layer and an adhesion layer of a fixing member was evaluated in each of Examples 1 to 9 and Comparative Examples 1 and 2 by the following method. That is, 10 test pieces were cut from a laminated body including a silicone rubber layer, an adhesion layer and a surface layer which are laminated on a substrate of a fixing member. Herein, a test piece was cut to have a planar shape of a square of 20 mm×20 mm. An operation for separating a surface layer from an adhesion layer was performed for each of the test pieces. In this case, the adhesion layer caused cohesion failure, so that a percentage of an area (%) adhered to a separate piece of the surface layer was calculated. The percentage of an area was calculated for each of the test pieces, and adhesive strength of a surface layer to an adhesion layer in each of Examples and Comparative Examples was evaluated with an average value (rounded off a number to the nearest integer) of these percentages of areas.

Further, the purpose of the present evaluation method will be described below.

That is, when adhesive strength between a surface layer and an adhesion layer is high, it becomes difficult to cause separation at an interface between the surface layer and the adhesion layer, and thereby cohesion failure is caused in a silicone rubber layer. As a result, the silicone rubber layer which caused cohesion failure is adhered to a separate piece of a surface layer. On the contrary, when adhesive strength between a surface layer and an adhesion layer is weak, separation at an interface between the surface layer and the adhesion layer is easily caused. That is, as adhesive strength is stronger, a ratio of a silicone rubber layer existing on a surface of a separate piece of a surface layer is increased. In addition, when separation is caused at an interface between the surface layer and the adhesion layer, the silicone rubber layer is not adhered to the separate piece of the surface layer. Therefore, the degree of a silicone rubber layer adhered to the separate piece of the surface layer becomes a measure of a magnitude of adhesive strength between the surface layer and the adhesion layer.

[Evaluation of Adhesion Durability]

Each of fixing rollers of Example 1 and Comparative Example 1 was mounted as the fixing roller 4 on a fixing apparatus (FIG. 3) which is a configuration of the present invention, and this fixing apparatus was subjected to paper feed durability test. Paper feeding was performed under the condition of a setting temperature of a fixing roller surface of 190° C. and a process speed of 150 mm/sec, and adhesion durability was evaluated by whether failure was caused due to adhesion failure or not.

Further, a fixing belt of Example 9 was mounted as the fixing belt 8 on a fixing apparatus (FIG. 4) which is a configuration of the present invention, and this fixing apparatus was subjected to paper feed durability test. Paper feeding was performed under the condition of a setting temperature of a heating member rear surface of 210° C. and a process speed of 150 mm/sec, and adhesion durability was evaluated by whether failure was caused due to adhesion failure or not.

Example 1

Preparation of Adhesion Layer Forming Solution

Equivalent moles of the following (a) to (c) and the following (d) as a catalyst are dissolved in 0.5 parts by mass of methanol based on 100 parts by mass of silane compounds ((a) and (b)) so that the silane compounds were adjusted to have a concentration of 5%.

(a) 3-aminopropyl triethoxy silane (produced by Kishida Chemical Co., Ltd.)

(b) Triethoxy vinyl silane (produced by Kishida Chemical Co., Ltd.)

(c) Polyethylene glycol (average molecular weight 300, produced by Kishida Chemical Co., Ltd.)

(d) Di-n-butyltin dilaurate (produced by Kishida Chemical Co., Ltd.)

[Preparation of Fixing Roller]

A dimethyl silicone rubber layer having a thickness of 1.5 mm was formed on core metal in a roller form made of aluminum (an outer diameter 35 mm). A surface of the silicone rubber layer was irradiated with ultraviolet rays for 30 minutes (UV irradiation apparatus manufactured by Harison Toshiba Lighting Corporation) while rotating this core metal.

Herein, specific conditions of ultraviolet irradiation were set as follows:

Low-pressure mercury lamp (trade name: Low-pressure mercury lamp for light cleaning GCQ500US/11 manufactured by Toshiba Corporation);
Distance between a lamp and a work: 2 cm;
Illuminance at a work position: about 26 mW/cm$^2$ (a wavelength 254 nm); and
Number of revolutions of a work: 25 rpm.

This roller is fixed horizontally and the above-mentioned adhesion layer forming solution was spray-coated on a surface of the silicone rubber layer while rotating the roller. The coated silicone rubber layer was left standing at room temperature for 30 minutes, and then heated in an oven (at 130° C. for 10 minutes). Thereby, an adhesion layer having a thickness of 1 μm was formed. A surface of this adhesion layer was subjected to ESCA analysis, and the result showed that C—O/Si—O in the adhesion layer was 6.6.

Next, the following (e) to (h) were dissolved in methyl isobutyl ketone so that a fluoropolymer component has a concentration of 10% by mass, and thereby a coating solution for forming a surface layer was prepared.

(e) 100 parts by mass of fluoropolymer containing iodine in a molecule as a reactive group and including a terpolymer of vinylidene fluoride, tetrafluoroethylene and perfluoro methyl vinyl ether (Daiel LT-302 produced by Daikin Industries Ltd.)

(f) 50 parts by mass of silicone-based surfactant of a copolymerization type including a structure in which dimethylpolysiloxane and a polyoxyalkylene are alternately and repeatedly combined with each other (FZ-2207 produced by Dow Corning Toray Silicone Co., Ltd.)

(g) 8 parts by mass of triallyl isocyanurate (TAIC produced by Nippon Kasei Chemical Co., Ltd.)

(h) 8 parts by mass of benzoyl peroxide (25% hydrous product produced by Kishida Chemical Co., Ltd.)

This coating solution for forming a surface layer was spray-coated on an outer periphery of the above-mentioned core metal having an adhesion layer formed thereon so as to have a thickness of 30 μm after drying. Thereafter, the core metal was heated in an oven whose inside atmosphere has been replaced with nitrogen gas (Inert Gas Oven INL-60 manufactured by Koyo Thermo Systems Co., Ltd.) at 200° C. for 60 minutes. Subsequently, the core metal was heated at 180° C. for 24 hours in a conventional oven to obtain a fixing roller having a surface layer including fluorine rubber on the adhesion layer.

Examples 2 to 4 and 7

A fixing roller was prepared in the same manner as in Example 1 except that molar ratios of (a) to (c) constituting the adhesion layer forming solution in Example 1 were changed as shown in Table 1 below.

Example 5

A fixing roller was prepared in the same manner as in Example 1 except that polyethylene glycol constituting the adhesive layer forming solution in Example 1 was replaced with polypropylene glycol (PPG) and a molar ratio of (a), (b) and PPG was set to 1:1:1.25.

Example 6

A fixing roller was prepared in the same manner as in Example 1 except that polyethylene glycol of the components constituting the adhesive layer forming solution in Example 1 was replaced with ethylene glycol and a molar ratio of (a), (b) and ethylene glycol was set to 1:1:0.8.

Example 8

A dimethyl silicone rubber layer having a thickness of 300 μm was formed on an outer periphery of a substrate in an endless belt form (manufactured by SUS, an outer diameter 30 mm, a thickness 30 μm). A surface of the silicone rubber layer was irradiated with ultraviolet rays for 30 minutes in the same manner as in Example 1 while rotating this belt.

This belt is fixed horizontally and an adhesion layer forming solution prepared in the same manner as in Example 1 was spray-coated while rotating the belt. The coated silicone rubber layer was left standing at room temperature for 30 minutes, and then heated in an oven (at 130° C. for 10 minutes). Thereby, an adhesion layer having a thickness of 1 μm was formed. A surface of this adhesion layer was subjected to ESCA analysis and the result showed that C—O/Si—O in the adhesion layer was 6.6.

Next, a coating solution for forming a surface layer prepared in the same manner as in Example 1 was spray-coated on an outer periphery of a substrate having the adhesion layer formed thereon so as to have a thickness of 30 μm after drying. Thereafter, the substrate was heated in an oven whose inside atmosphere has been replaced with nitrogen gas (trade name: Inert Gas Oven INL-60 manufactured by Koyo Thermo Systems Co., Ltd.) at 200° C. for 60 minutes. Subsequently, the substrate was heated at 180° C. for 24 hours in a conventional oven to obtain a fixing belt having a surface layer including fluorine rubber on the adhesion layer.

Example 9

A fixing belt was prepared in the same manner as in Example 8 except that a coating solution for forming a surface layer was spray-coated so as to have a thickness of 150 μm after drying in Example 8.

Comparative Example 1

A fixing roller was prepared in the same manner as in Example 1 except that polyethylene glycol of the components constituting an adhesive layer forming solution in Example 1 was not used.

Comparative Example 2

A fixing roller was prepared in the same manner as in Example 6 except that a molar ratio of (a), (b) and ethylene glycol constituting an adhesive layer forming solution in Example 6 was set to 1:1:0.5.

The results of C—O/Si—O ratio on the adhesion layer surface and initial evaluation of adhesion for each of Examples 1 to 9 and Comparative Examples 1 and 2 were shown in Table 1 below.

TABLE 1

| | Configuration of fixing member | Ratio of adhesion component in adhesion layer forming solution (molar ratio) | C—O/Si—O in adhesion layer | Initial evaluation of adhesion (%) |
|---|---|---|---|---|
| Example 1 | Roller | Aminosilane:vinylsilane:PEG = 1:1:1 | 6.6 | 91 |
| Example 2 | Roller | Aminosilane:vinylsilane:PEG = 1:1:0.45 | 3.0 | 86 |
| Example 3 | Roller | Aminosilane:vinylsilane:PEG = 1:1:0.25 | 1.8 | 43 |
| Example 4 | Roller | Aminosilane:vinylsilane:PEG = 1:1:1.5 | 10.0 | 95 |
| Example 5 | Roller | Aminosilane:vinylsilane:PPG = 1:1:1.25 | 8.3 | 82 |
| Example 6 | Roller | Aminosilane:vinylsilane:EG = 1:1:0.8 | 1.0 | 21 |
| Example 7 | Roller | Aminosilane:vinylsilane:PEG = 1:1:3.1 | 20.0 | 64 |
| Example 8 | Belt | Aminosilane:vinylsilane:PEG = 1:1:1 | 6.6 | 92 |
| Example 9 | Belt | Same as above | 6.6 | 92 |
| Comparative Example 1 | Roller | Aminosilane:vinylsilane = 1:1 | 0.2 | 5 |
| Comparative Example 2 | Roller | Aminosilane:vinylsilane:EG = 1:1:0.5 | 0.7 | 8 |

PEG: Polyethylene glycol (trade name: Polyethylene glycol 300 produced by Kishida Chemical Co., Ltd.)
PPG: Polypropylene glycol (trade name: Polypropylene glycol 400 produced by Kishida Chemical Co., Ltd.)
EG: Ethylene glycol (1,2-diethoxyethane produced by Kishida Chemical Co., Ltd.)

Consideration of Evaluation Result of each of Examples and Comparative Examples A fixing member of each of Examples 1, 2, 4, 5, 8, 9 had C—O/Si—O in an adhesion layer of 3 or more and 10 or less, and initial evaluation of adhesion of 80% or more, and thus exhibited extremely good adhesion.

Further, the results of evaluation of adhesion durability showed that the fixing roll of Example 1 and the fixing belt of Example 9 did not cause adhesion failure even when 100,000 sheets of paper were fed thereon, and therefore had extremely excellent performance as a fixing member and a fixing apparatus.

On the other hand, C—O/Si—O in an adhesion layer was less than 1 in each of Comparative Examples 1 and 2, and thus exhibited very low adhesion. In addition, evaluation of adhesion durability for the fixing roller of Comparative Example 1 was performed, and as a result, adhesion failure was caused when 30,000 sheets of paper were fed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-346269, filed Dec. 22, 2006, and Japanese Patent Application No. 2007-305998, filed Nov. 27, 2007, which are hereby incorporated by reference herein in their entirety.

What is claimed is:

1. A fixing member comprising a substrate, an adhesion layer and a surface layer disposed in contact with the adhesion layer,
    wherein the surface layer includes fluorine rubber having an ether bond and a polysiloxane having a polyether structure, and
    wherein the adhesion layer contains a polyorganosiloxane resin and an existence ratio of carbon combining with oxygen to silicon combining with oxygen in the adhesion layer is 1.0 or more and 20.0 or less.

2. The fixing member according to claim 1, wherein the substrate is silicone rubber and the polyorganosiloxane resin further has a carbon-nitrogen bond.

3. A method for manufacturing a fixing member comprising the steps of:
    (1) forming an adhesion layer containing a polyorganosiloxane resin on a substrate; and
    (2) forming a coating film of a coating material including a fluorine atom-containing polymer having an ether group in a molecule and a polysiloxane having a polyether structure on a surface of the adhesion layer, and crosslinking the coating film to form a surface layer including fluorine rubber having an ether bond and a polyorganosiloxane having a polyether structure.

4. The method for manufacturing a fixing member according to claim 3, wherein the substrate is silicone rubber and the method further comprises a step of previously irradiating a surface of the substrate with ultraviolet rays before the step (1).

5. A fixing apparatus comprising a fixing member according to claim 1.

6. The fixing apparatus according to claim 5, wherein the fixing member is used for at least one of a fixing roller and a pressure roller which is disposed opposed to the fixing roller.

7. The fixing apparatus according to claim 5, wherein the fixing member is used for at least one of a fixing belt and a pressure belt which is disposed opposed to the fixing belt.

8. An electrophotographic image forming apparatus comprising a fixing apparatus according to claim 5.

* * * * *